Figure 1:
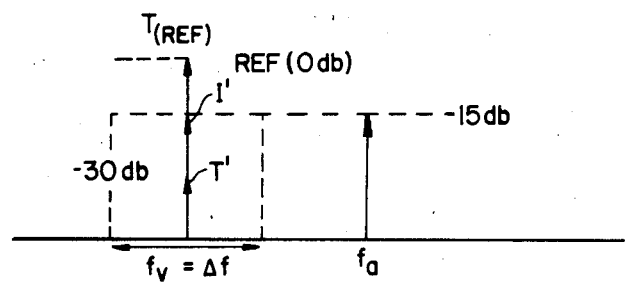

United States Patent [19]

Mistry

[11] Patent Number: 4,682,359
[45] Date of Patent: Jul. 21, 1987

[54] TELEVISION PICTURE AND SOUND SCRAMBLER AND METHOD

[75] Inventor: Kantilal Mistry, Freehold, N.J.

[73] Assignee: Blonder-Tongue Laboratories, Inc., Old Bridge, N.J.

[21] Appl. No.: 661,091

[22] Filed: Oct. 15, 1984

[51] Int. Cl.$^4$ ............................................. H04N 7/167
[52] U.S. Cl. .......................................... 380/7; 380/10
[58] Field of Search ........................ 358/118; 380/7, 10

[56] References Cited

U.S. PATENT DOCUMENTS

| | | | |
|---|---|---|---|
| 3,175,033 | 10/1965 | Blonder et al. | 178/5.1 |
| 3,202,758 | 8/1965 | Brownstein | 358/118 |
| 3,813,482 | 3/1974 | Blonder | 178/5.1 |
| 4,074,311 | 2/1978 | Tanner et al. | 358/118 |
| 4,085,422 | 4/1978 | Niwata et al. | 358/118 |
| 4,095,258 | 6/1978 | Sperber | 358/120 |
| 4,163,252 | 6/1979 | Mistry et al. | 358/118 |
| 4,222,067 | 9/1980 | Stern et al. | 358/118 |
| 4,268,860 | 5/1981 | Blonder | 358/118 |
| 4,313,133 | 1/1982 | Fukushima | 358/118 |
| 4,398,214 | 8/1983 | Gargini | 358/118 |

*Primary Examiner*—Stephen C. Buczinski
*Assistant Examiner*—Aaron J. Lewis
*Attorney, Agent, or Firm*—Rines and Rines, Shapiro and Shapiro

[57] ABSTRACT

Television signal scrambling is effected by combining moderate level trap-attenuation of the visual carrier frequency with an injected fm-modulated interfering signal to effect, by adjustment of amplitude and fm-modulation levels, satisfactory picture scrambling and overpowering audio distortion in the user's television receiver.

7 Claims, 2 Drawing Figures

TELEVISION PICTURE AND SOUND SCRAMBLER AND METHOD

The present invention relates to television picture and sound scramblers and methods of operation of the same as for use in subscription or other security television or other video and related systems and the like, being more specifically directed to such systems in which interfering signals are employed to effect signal distortion.

Several approaches to signal scrambling or distorting (encoding) and signal unscrambling or restoring (decoding) have been and are being successfully employed in over-the-air, cable and other television systems, such as "BT Vision" of Blonder-Tongue Laboratories, New Jersey, involving horizontal and/or vertical sync jitter and the like, and also described in U.S. Pat. Nos. 3,813,482; 4,095,258 and 4,163,252 of common assignee herewith, as well as more simplified approaches, such as switched or wobbulating traps as described, for example, in U.S. Pat. Nos. 3,175,033 and 4,268,860, also of common assignee. There are circumstances, however, where greatly simplified and low cost scrambling systems are required, as in cable and related subscription systems, and where both effective picture scrambling and audio signal distortion are to be produced with the aid of filter or trap circuits and interfering signal oscillators that avoid critical circuit requirements such as trap or oscillator stability and the like.

It is primarily, though not exclusively, to these applications (and others) that the present invention is directed; it being an object of the invention to provide a new and improved trapping picture and sound scrambler and decoder particularly suitable for such applications and void of the complexity and/or other limitations of prior systems including those above discussed.

An additional object is to provide a novel video and sound trapping apparatus of more general applicability, as well.

Other and further objects will be explained hereinafter and are more definitely pointed out in the appended claims.

In summary, though, from one of its important aspects, the present invention embraces a method of scrambling television and similar signals comprising channel visual carrier frequency and audio frequency-modulated carrier frequency signals, that comprises, moderately trapping the visual carrier frequency to attenuate the same, injecting an interfering frequency modulated signal upon the attenuated visual carrier frequency, adjusting the amplitude of the interfering signal to be comparable to that of the audio carrier frequency signal, and adjusting the frequency deviation of the interfering signal frequency modulation to be higher than that of the standard audio frequency modulation of the audio carrier frequency to provide effective scrambling of the television visual signal and overpowering level of the audio signal. Best mode and preferred embodiments and details are hereinafter set forth.

Figure 2:
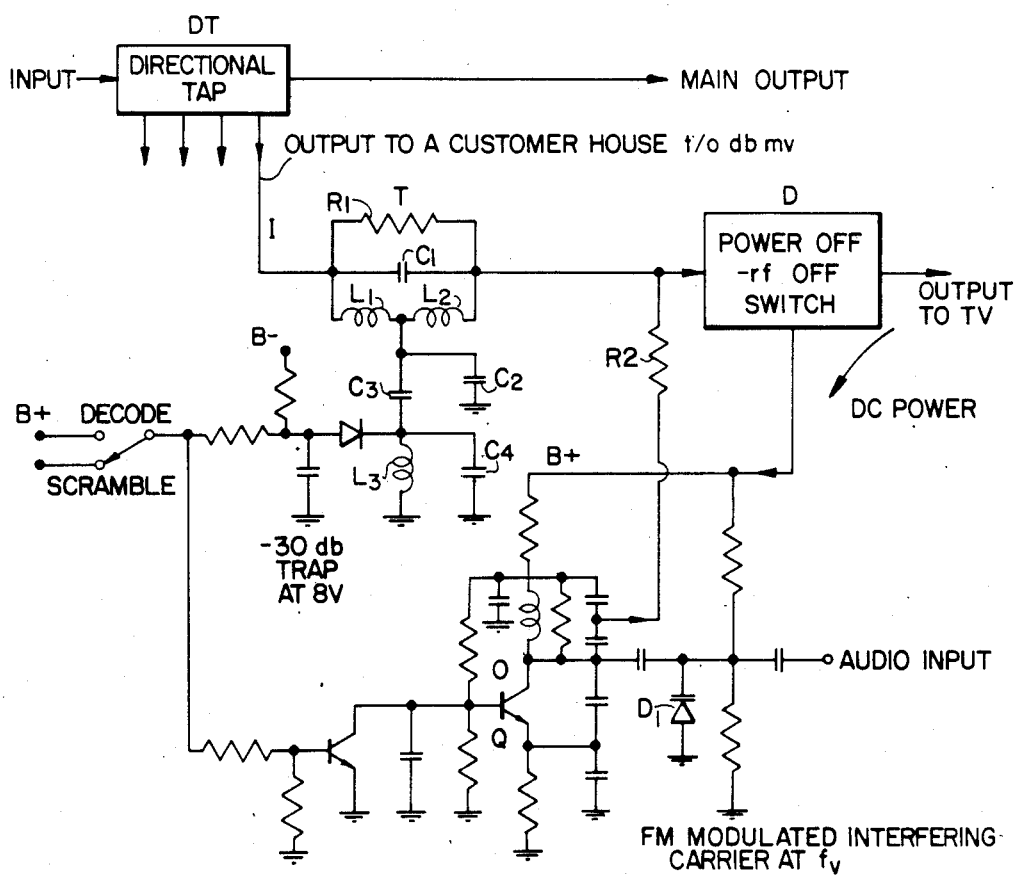

The invention will now be described with reference to the accompanying drawing,

FIG. 1 of which is a spectrum chart illustrative of the technique of the invention; and FIG. 2 is a circuit diagram of a preferred apparatus for carrying out the invention.

Referring to FIG. 2, an application to trunk line distribution in cable television systems is shown in which input television channel signals are applied via a directional tap DT with, say about 25 db isolation between taps, the output applying all TV channels to the input of each home television set at I. The input I may have about +10 db/mv signal fed to a scrambler trap T, tuned to the visual carrier frequency $f_v$ (FIG. 1), with moderate-level trapping of the order of, say, −30 db. The trap T is shown having a series-parallel branch made of $R_1$, $C_1$ $L_1$, $L_2$ and $C_2$, $C_3$, $C_4$, $L_3$. Other attenuating trap configurations may, of course, also be used. The −30 db trapping of the input visual carrier $f_v$ ($T_{REF}$) is shown by vector T' in FIG. 1.

In accordance with the invention, a moderate level of interfering signal at $f_v$ is injected which is fm-modulated at an audio frequency to provide excellent video and audio scrambling. This is effected by an oscillator O of frequency $f_v$, to the transistor stage Q of which is applied an audio frequency signal input that frequency-modulates the oscillator-generated interfering frequency $f_v$, the harmonics of which are about 50 db down—the interfering signal being injected through coupling resistor $R_2$, shown by the vector I' in FIG. 1, about −15 db from original level, substantially the same level as the audio carrier $f_a$. The frequency modulation deviation may be about ±150 kHz deviation at an audio frequency rate. The frequency modulation is achieved by using a varicap diode $D_1$.

Thus, with the before-mentioned exemplary 25 db isolation between the home taps, the level of the interfering signal in an authorized subscription channel of the adjacent home tap output will be about −60 db/mv, giving 70 db signal-to-interfering signal ratio in the authorized pay channel. This video carrier attenuation and injected interfering signal has been found to provide most satisfactory video picture scrambling. The frequency modulation $\Delta f$ of the interfering signal (at the same −15 db level as the audio carrier $f_a$), moreover, mixes as inter-carrier with $f_a$ in the home television set, distorting the audio signal. The fm deviation $\Delta f$ (say of the order of ±150 kHz as before stated) is much higher than the standard TV audio 25 kHz modulation, resulting in overpowering distortion.

It should also be noted that the attenuating trap T also serves the function of allowing the interfering signal modulation to be injected at a lower level than without the same, and also serves to block the same from the input feed line. This type of circuit configuration of FIG. 2, in addition, provides a low cost scrambling circuit requiring no hardware inside the customer's house since the scrambler can be outside the home and remote from the customer. The circuit eliminates all criticality in the stability of the trap T and/or of the interfering oscillator O. The power line may be the house or the main distribution system and, if desired, a diode "power off -rf off" switch may be used as shown at D to prevent the customer defeating scrambling if the power control is in the home. Decoding of unscrambling by an authorized decoder, obviating the distortion effects of the trap T and oscillator O may be effected in well-known manner, as, for example, by the trap switching devices of the earlier referenced patents.

Further modifications will occur to those skilled in this art and such are considered to fall within the spirit and scope of the invention as defined in the appended claims.

What is claimed is:

1. A method of scrambling television signals comprising channel visual carrier frequency and audio frequency-modulated carrier frequency signals, that comprises, trapping the visual carrier frequency to attenuate the same, injecting an interfering frequency-modulated carrier signal upon the attenuated visual carrier frequency at substantially the same carrier frequency as the visual carrier, adjusting the amplitude of the interfering signal to be substantially that of the audio carrier frequency signal, and adjusting the frequency deviation of the interfering signal frequency modulation to be substantially higher than that of the standard audio frequency modulation of the audio carrier frequency to provide effective scrambling of the television visual signal and overpowering the audio signal.

2. A method as claimed in claim 1 and in which the trapping attenuation is effected at substantially −30 db and the interfering signal is injected at substantially −15 db.

3. A method as claimed in claim 2 and in which said frequency deviation is set at substantially ±150 kHz.

4. Scrambling apparatus for television signals comprising channel visual carrier frequency and audio frequency-modulated carrier frequency signals, that comprises, trap means tuned to said visual carrier frequency and adjusted to attenuate the same to a level of substantially −30 db; oscillator means for generating an interfering carrier signal and provided with audio-frequency means for effecting frequency modulation of the same; means for injecting the output of the oscillator means into the attenuated visual carrier frequency signal at substantially the same carrier frequency as the visual carrier; means for adjusting the amplitude of the interfering signal to be substantially that of the audio carrier frequency signal; and means for adjusting the frequency deviation of the interfering signal frequency modulation to be substantially higher than that of the standard audio frequency modulation of the audio carrier frequency.

5. Scrambling apparatus as claimed in claim 4 and in which the visual carrier frequency signal amplitude is substantially 15 db down from the untrapped reference visual carrier frequency.

6. Scrambling apparatus as claimed in claim 4 and in which said frequency deviation is adjusted to substantially ±150 kHz and mixes as intercarrier with the audio carrier frequency in the user's television receiver to overpower the audio signal.

7. Scrambling apparatus as claimed in claim 4 and in which means is provided for powering the scrambling apparatus from the user's home including power off-rf off switch means to prevent defeating the scrambling.

* * * * *